May 13, 1952  R. M. DENSMORE ET AL  2,596,471
VARIABLE-STOP HYDRAULIC SYSTEM
Filed Jan. 21, 1950  3 Sheets-Sheet 1
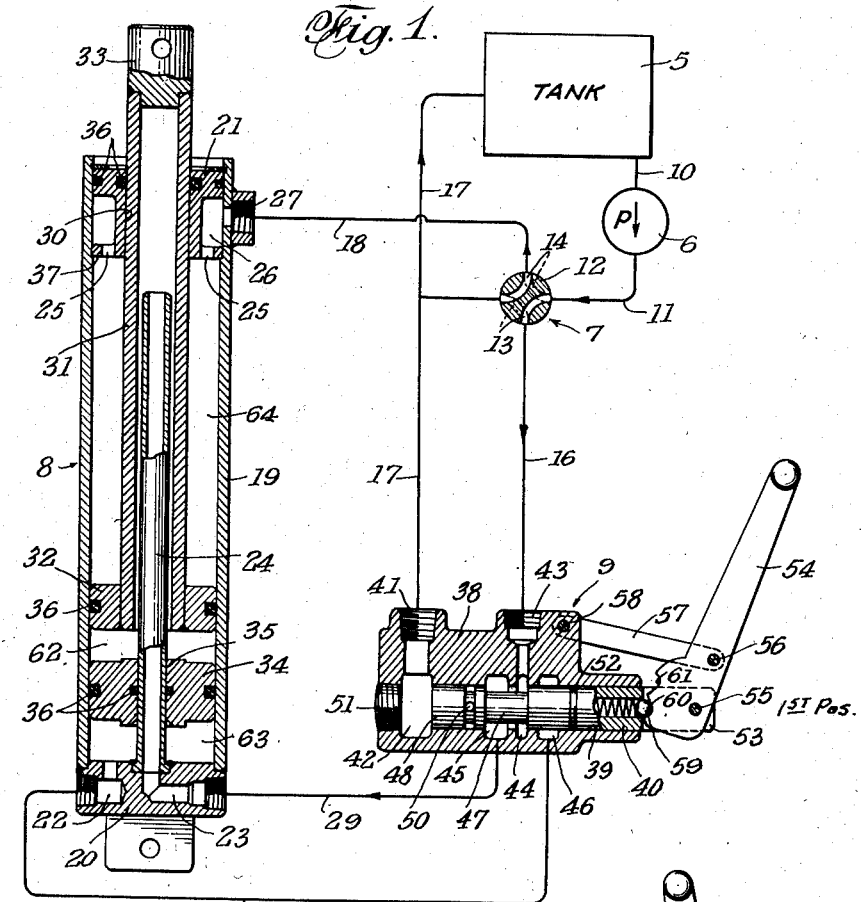
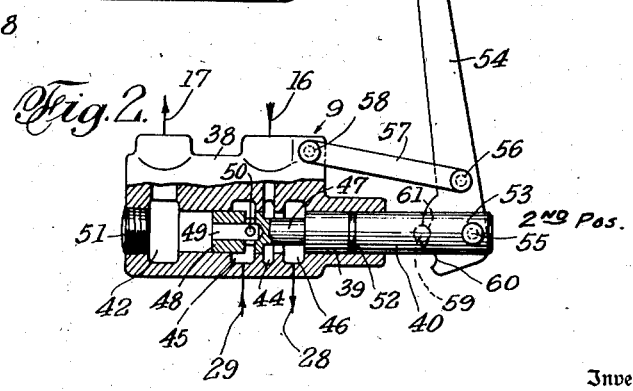
Inventors
RICHARD M. DENSMORE
NEVILLE J. DALTON
By
C. G. Stratton
Attorney

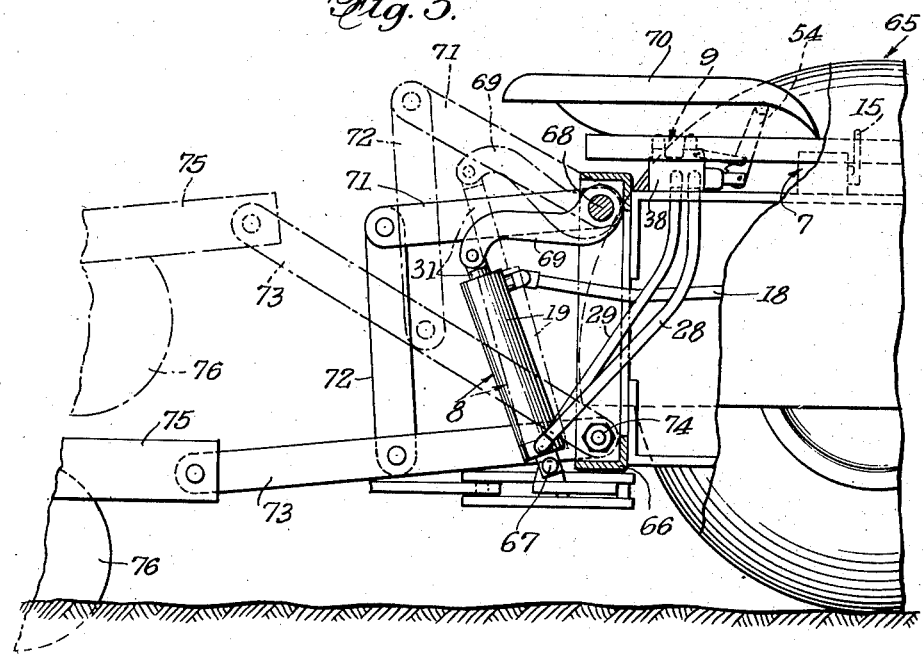

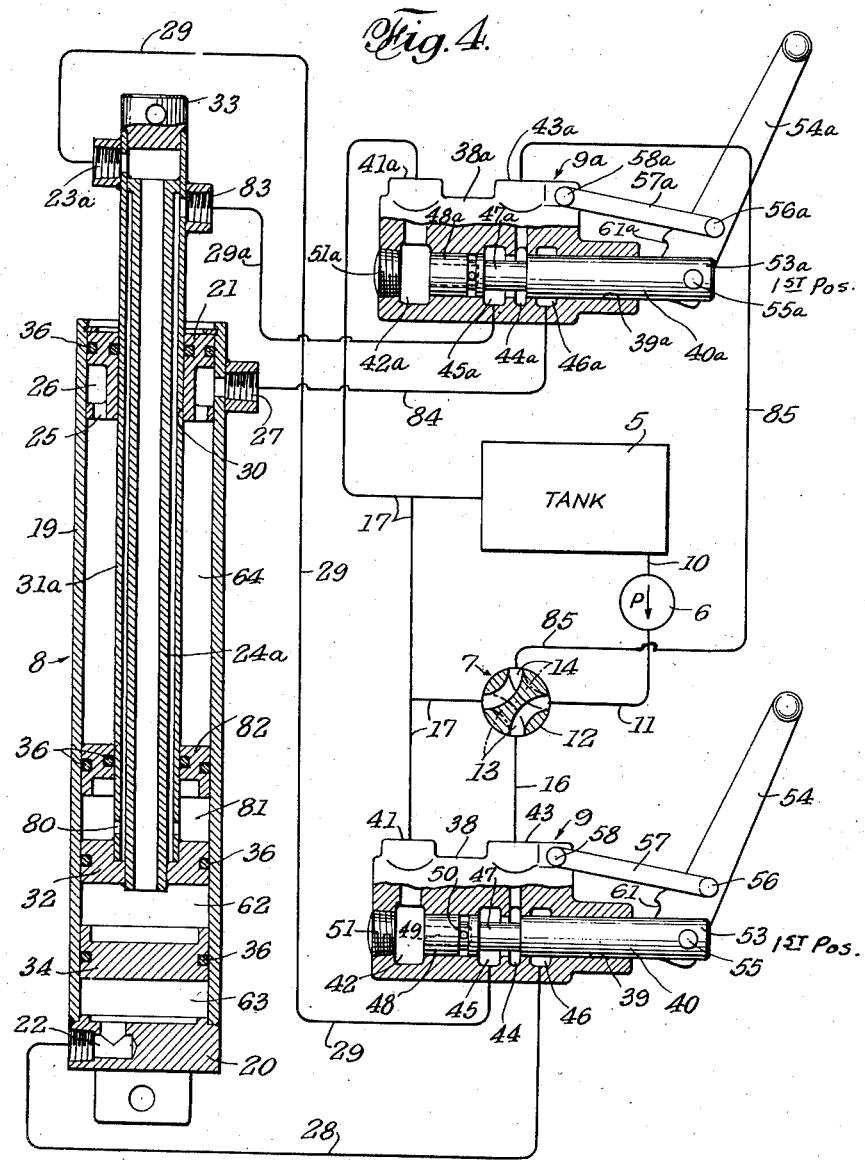

Patented May 13, 1952

2,596,471

UNITED STATES PATENT OFFICE 2,596,471

VARIABLE-STOP HYDRAULIC SYSTEM

Richard M. Densmore, South Gate, and Neville J. Dalton, Huntington Park, Calif.

Application January 21, 1950, Serial No. 139,824

3 Claims. (Cl. 121—38)

This invention relates to an hydraulic system in which the stroke of the piston of the operating cylinder thereof is adapted to be adjusted.

While the present system has many applications, the same is particularly adapted to control the raised and lowered positions of agricultural machines such as cultivators, harrows, etc. From time to time, it is necessary to raise such machines relative to the ground. At the present time there are various hydraulic devices that effect such operation by the operator from his seat on a towing tractor. However, should it become desirable to adjust the depth of earth penetration of the discs, plows, tines, etc. of such agricultural machines, the operator must leave his seat to manipulate the means effecting such adjustment. Accordingly, the adjustment is made while the agricultural machine is at rest and may not be the proper adjustment when the machine is in operation. This results in a series of trial-and-error adjustments that are time-consuming and generally unsatisfactory. When it is realized that the depth of earth penetration may require adjustment many times during the traverse of a field, it will be seen that independent adjustment while the machine is at rest is not desirable.

An object of the present invention, therefore, is to provide a novel hydraulic system that is adapted to be mounted on a tractor and to be controlled from the operator's seat thereof, whereby an agricultural machine, being towed by the tractor, can be raised and lowered as desired, and whereby the depth of penetration of the earth-engaging implements of such a machine can be varied, all while the machine is in motion. Thus, the operator, from his seat, can judge the adjustment under actual working conditions.

Another object of the invention is to provide an hydraulic system, as indicated, in which the operating cylinder thereof is provided with a stop for the piston of said cylinder and with novel means, controlled from the operator's seat, for adjusting the position of said stop, as desired.

Another object of the invention is to provide an hydraulic cylinder embodying a hydraulically adjustable stop for the piston of said cylinder to provide a variable limit stop for said piston.

A further object of the invention is to provide a novel selector valve, whereby normal raising and lowering of the piston and adjustment of the stop are each effected selectively.

A still further object of the invention is to provide an hydraulic cylinder having a piston and embodying adjustable stops, one on each side of said piston, whereby not only the stroke of the piston may be adjusted, but the same length of stroke may be obtained at different portions of the cylinder.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes preferred embodiments of the present invention, which are given by way of illustration or example only.

In the drawings, like reference characters designate similar parts in the several views.

Fig. 1 is a schematic view of one form of the present system in which the operating hydraulic cylinder and the selector valve are shown in longitudinal section, the parts being arranged for normal raising and lowering operation of the piston of said cylinder.

Fig. 2 is a longitudinal sectional view of the selector valve in the position controlling adjustment of the variable stop of the hydraulic cylinder.

Fig. 3 is a side view of the rear end of a towing vehicle for an agricultural machine, showing one manner of application of the present system.

Fig. 4 is a schematic view, similar to Fig. 1, of another form of system in which the hydraulic cylinder embodies an adjustable stop on each side of the piston thereof.

The present variable stop hydraulic system, as illustrated in Figs. 1 and 2, comprises, generally, a liquid storage tank 5, a pump 6 for drawing liquid from said tank, a four-way valve 7 for controlling liquid flow, an hydraulic cylinder unit 8, and a selector valve 9 for controlling liquid flow to and from said unit, said valves 7 and 9 cooperating, according to their settings, to control the operation of cylinder unit 8.

Tank 5 is a conventional pressureless vessel that serves as a reservoir for hydraulic fluid. The pump 6 is also conventional and serves to draw liquid from tank 5 through a line 10 and direct said liquid, under pressure, through a line 11. The four-way valve 7 is also conventional and includes an adjustable plug or core 12 which embodies ports 13 and 14, said plug being selectively positionable as by a manipulating handle 15 (Fig. 3). In the position shown in full lines, port 13 connects line 11 and a line 16, and port 14 connects lines 17 and 18 of which the former is a return line to tank 5.

The hydraulic cylinder unit 8 comprises a cylinder 19 having end closures 20 and 21. Closure 20 is provided with a port 22 which opens directly into the interior of cylinder 19, and with a port 23 that communicates with an elongated tube 24 that extends axially into the cylinder and terminates at a point adjacent the opposite end closure 21.

End closure 21 is provided with a series of holes 25 that communicate the interior of the cylinder with an annular chamber 26 formed in said end closure. A port 27 connects with said chamber. Line 18 connects with port 27, and the respective lines 28 and 29 connect with ports 22 and 23.

End closure 21 is provided with an axial passage 30 for the tubular stem 31 of a piston 32 operating in a cylinder 19. The end of stem 31 that extends beyond closure 21 comprises a solid plug 33. Otherwise, said stem is hollow and of such size as to freely receive tube 24 with suitable clearance that affords flow from the open end of said tube into cylinder 19 between piston 32 and end closure 20.

In the latter-mentioned portion of the cylinder, there is fitted a stop element 34 that is slidable in said cylinder and has a passage bore 35 through which tube 24 extends. End closure 21, piston 32, and stop element 34, as shown, are each provided with suitable sealing rings or the like that seal against the inner wall of cylinder 19, and the outer walls of tube 24 and stem 31, as the case may be. Such sealing rings are indicated at 36.

It will be seen that inner face 37 of end closure 21 comprises a fixed stop for piston 32 to limit the outward stroke of said piston and stem 31. Stop 34, according to its position in cylinder 19, comprises a fixed but adjustable stop for said piston to limit its inward stroke. When stop 34 is resting against end closure 20, maximum stroke of the piston is afforded. The nearer to closure end 21 that said stop is positioned, the shorter is the piston stroke.

The selector valve 9 comprises a body 38 that has a longitudinal bore 39 in which operates a piston valve 40. A port 41, connected to line 17, communicates with a chamber 42 at one end of bore 39. Another port 43, connected to line 16, communicates with a chamber 44 at an intermediate point of bore 39. Between chambers 42 and 44 is provided a chamber 45, and on the opposite side of chamber 44 there is provided a chamber 46. Line 29 communicates with chamber 45 and line 28 with chamber 46.

The piston valve 40 has a cylindrically reduced portion 47, which, depending on the position of the same, either provides for communication of chambers 44 and 45, as in Fig. 1, or communication of chambers 44 and 46, Fig. 2. On one side of portion 47, the piston has a portion 48 that fits the bore between chambers 42 and 45. In the first position, said portion 48 seals between said chambers, while in the second position, an end port 49 in the piston valve and in communication with a ported annular groove 50 in portion 48, effects communication between chambers 42 and 45. A plug 51 closes bore 39 at one end. At the opposite end, a sealing ring 52 on the piston valve seals against outward flow. A bifurcated end 53 is provided on piston valve 40, the same extending beyond body 38.

Means is provided for shifting piston valve 40 from one to the other of the above-mentioned two positions. As shown, said means comprises a handle 54 that is fitted into bifurcation 53 and connected to piston valve 40 by a pivot pin 55. A floating fulcrum 56 for said handle is carried on a link 57 that is pivoted at 58 on body 38. To insure retention of the piston valve in either position, a spring-urged detent ball 59, carried by said piston valve, has selective engagement in seats 60 and 61 formed in handle 54. When seat 60 is engaged with the detent, the piston valve is held in the first-described position, and when handle 54 is swung on its pivot to engage the detent and seat 61, said piston valve is held in the second-described position.

Fig. 1 shows the system while piston 32 and stem 31 are being projected away from stop 34. With pump 6 operating, fluid passes from tank 5 through line 11, valve port 13 and line 16 to chamber 44, and then to chamber 45, through line 29 to port 23 and into tube 24. Said fluid fills the interior of stem 31 and the space 62 in cylinder 19 between stop 34 and piston 32. Since fluid in space 64 in cylinder 19 between piston 32 and end closure 21 is simultaneously displaced through port 27, line 18, port 14 and line 17, into non-pressure tank 5, the piston and stem will be forced in a direction away from stop 34. End closure 21 limits this movement. Stop 34 is immobile during this movement since fluid in cylinder 19 in space 63 is trapped because chamber 46 is sealed off against flow. Thus, the stop 34 constitutes a firm abutment for the pressure of fluid that projects the piston.

When retraction of the piston is desired, valve 9 is left in its initial or first position and valve 7 turned so that port 14 communicates lines 11 and 16 and port 13, lines 16 and 17. Now, the pressure of fluid from the pump flows in space 64 of the cylinder, forcing piston 32 down so that the same displaces fluid in space 62 through tube 24, line 29, chambers 45 and 44, line 16, port 13 and line 17, into tank 5. Stop 34 limits this movement the fluid in space 63 still being trapped, as before.

It will be seen that only the four-way valve 7 is manipulated to project and retract the piston.

When it is desired to shorten the stroke or to adjust one movement-limiting abutment—in this case, stop 34—handle 54 is moved to shift valve 9 to the second position as shown in Fig. 2. Valve 7 is left in the first position. Now, fluid under pressure in line 16 flows through chambers 44 and 46, line 28, and port 22 into space 63, forcing stop 34 in a direction toward cylinder end 21. Since space 62, through tube 24, line 29, chamber 45, ported groove 50, end port 49, and chamber 42, is connected to line 17, the fluid in said space will be evacuated into tank 5 during such movement of stop 34. When said stop engages piston 32, the movement of the former will be transmitted to the latter and effect displacement of fluid in space 64 through line 18, valve port 14 and line 17 into tank 5. When a desired position of stop 34 is achieved, valve 9 is re-shifted to its first position. Now, since fluid in space 63 is trapped by closure of chamber 46 and the pump pressure is transferred to space 62, said stop will come to rest at the adjusted position thereof.

When it is desired to lengthen the piston stroke, that is, to adjust stop 34 in a direction toward end closure 20, both valves 7 and 9 are placed in their second positions. Pressure fluid enters space 64 through lines 11 and 18 and valve port 14 to move piston 32 toward stop 34. Fluid in space 62 is displaced, as before, through lines 29 and 17 into tank 5. When the piston encounters stop 34, fluid in space 63 is displaced through lines 28, 16 and 17 into the tank. Stop 34 will, therefore, move toward cylinder end 20 and is stopped in desired adjusted position by re-shifting valve 9 to its first position.

With reference to Fig. 3, a tractor 65 is provided with a frame 66 at its rear end. The cylinder unit 8 of the present system is mounted on said frame on a pivot 67. An upper shaft 68 on said frame carries an arm 69 that is connected to piston stem 31. Valves 7 and 9 are mounted on the tractor in position to be handy to an operator on seat 70. While tank 5 and pump 6 are not shown in Fig. 3, it will, nevertheless, be evident, from the foregoing description, how the operator may manipulate valves 7 and 9 to adjust stop 34 or cause rocking of shaft 68.

On both sides of frame 66, shaft 68 carries rearwardly extending arms 71 which, through links 72, are connected to intermediate portions of longer rearwardly extending arms 73, the latter being pivoted at 74 to frame 66. It will be seen that arms 73, as the cylinder unit is operated, will move in an arc between a low and a high position, as shown, and that an agricultural machine connected to arms 73, suggested at 75, will be raised and lowered relative to the ground, accordingly.

So long as stop 34 is not disturbed, the low position of machine 75 will be the same, thereby effecting a certain depth penetration of the discs, plows or tines 76 of said machine. Substantially the lowest position of the machine is shown in the full lines of the drawing. It will be evident, therefore, that upward adjustment of stop 34 will raise the low position of said machine so that the cultivator depth is shallower and the stroke of piston stem 31 commensurately shorter.

The system shown in Fig. 4 embodies a second selector valve 9a similar to valve 9 and a modified form of hydraulic cylinder 8.

In the cylinder shown, tube 24 is replaced by a tube 24a which extends through piston stem 31a, and communicates space 62 with a port 23a at the outer end of said stem. The latter port is connected to line 29. Stem 31a now has an annular passage that is open at 80 to a space 81 between piston 32 and a second stop element 82 and to a port 83 also on the outer end of said stem. The latter port is connected by a line 29a to chamber 45a of valve 9a in the same manner that line 29 is connected to chamber 45 of valve 9.

In this case, previously-described line 18 is replaced by a line 84 connecting cylinder port 27 and chamber 46a of valve 9a, and a line 85 that connects chamber 44a of the latter valve and port 14, of valve 7. There are thus provided adjustable stops on each side of the piston so that not only the length of the stroke may be varied, but also the high and low terminating points of the stroke. The flexibility of adjustment of this arrangement should be apparent. The comparable portions of valve 9a to those of valve 9 have been given the same relative reference numbers with the addition of a sub a.

In Fig. 4, valves 7, 9 and 9a are each shown in the mentioned first position. It will be seen that fluid in spaces 63 and 64 is trapped because chambers 46 and 46a are closed to flow. Accordingly, stops 34 and 82 cannot move under pressure in spaces 62 and 81. Thus, piston 32 is moved in a direction toward stop 82 by pressure fluid entering tube 24a from lines 16 and 29, as fluid in space 81 is displaced through lines 29a and 85, valve port 14, and line 17 into tank 5.

With valves 9 and 9a in the first position and valve 7 moved to the second position, pressure fluid is brought to space 81 through lines 85 and 29a, causing the piston to move toward stop 34. At the same time, fluid in space 62 is displaced through tube 24a, lines 29 and 16, port 13, and line 17 into tank 5.

Thus, as for the first form of system, projection and retraction are effected solely by manipulation of valve 7, while valves 9 and 9a are in the first position.

When the stop 34 is to be adjusted in a direction toward closure 21, valves 9 and 9a are in the second position and valve 7 in the first position. Thus, pressure fluid is brought to space 63 while first space 62 and then space 81 exhaust to the tank through respective lines 29 and 29a, and line 17. After stop 34, piston 32 and stop 82, during such adjustment, have been brought into direct contact and further adjustment movement of stop 34 is desired, the flow is continued into space 63, and space 64 will exhaust through lines 84 and 85, through valve port 14 and line 17 in the tank.

When stop 34 is to be adjusted in a direction toward closure 20, valve 9 is placed in the second position, valve 9a in the first position and valve 7 in the second position. While stop 82 is held because line 84 is sealed off, fluid pressure in lines 85 and 29a enters space 81 and moves piston 32 to displace fluid in space 62 through lines 29 and 17 into the tank. When the piston engages stop 34, the fluid in space 63 will exhaust through lines 28, 16 and 17 into the tank. Thus stop 34 is moved away from stop 82.

When stop 82 is to be adjusted in a direction toward closure 20, the three valves 7, 9 and 9a are each placed in the second position. Pressure fluid from lines 85 and 84 enters space 64 to move the stop, while first space 81 and then space 62 evacuate to the tank through as before. Further adjustment entails evacuation of space 63 through lines 28 and 16, port 13, and line 17.

When stop 82 is to be adjusted in a direction toward closure 21, valves 7 and 9 are placed in the first position and valve 9a in the second position. While line 28 is sealed off to hold stop 34 against movement, first piston 32 is moved away from said stop to pick up stop 82 and move the same in the required direction.

To sum up:

| Operation Desired | Valve 9 | Valve 9a | Valve 7 |
|---|---|---|---|
| To project piston | 1st position | 1st position | 1st position. |
| To retract piston | do | do | 2nd position. |
| Stop 34 toward end 21 | 2nd position | 2nd position | 1st position. |
| Stop 34 toward end 20 | do | 1st position | 2nd position. |
| Stop 82 toward end 20 | do | 2nd position | Do. |
| Stop 82 toward end 21 | 1st position | do | 1st position. |

It will be seen that any desired adjustment of stops 34 relative to each other and also relative to the ends of the cylinder may be readily effected through the medium of the three valves 7, 9 and 9a.

While the invention that has been illustrated and described is now regarded as the preferred embodiments, the constructions are, of course, subject to modifications without departing from the spirit and scope of the invention. It is, therefore, not desired to restrict the invention to the particular forms of construction illustrated and described, but to cover all modifications that may fall within the scope of the appended claims.

Having thus described the invention, what is claimed and desired to be secured by Letters Patent is:

1. An hydraulic system comprising a cylinder having closed ends, a piston in said cylinder, two stop elements, one on each side of the piston, said cylinder, between its ends, being thereby divided into four spaces, a selector valve for controlling fluid flow through two of said spaces, a second selector valve for controlling flow through the other two spaces, a two-position four-way valve connected to both selector valves, and means to conduct fluid under pressure through the four-way valve to the selector valves, selectively, whereby the piston and the stops, selectively, are movable relative to each other and to the ends of the cylinder.

2. The system according to claim 1 in which the two selector valves are two-position devices, which, together with the two-positions of the four-way valve, are settable to conduct pressure fluid to the four spaces in the cylinder, selectively.

3. A variable-stop hydraulic unit, comprising a cylinder having an end closure, a stop element in said cylinder and movable therein, said end closure having a port for conducting fluid into the cylinder between said stop element and closure, a piston in the cylinder beyond said stop element, a hollow stem extending from the piston outwardly of the cylinder and terminating at its outer end in a port in communication with the space between the piston and stop element, a tube surrounding said stem and spaced therefrom to constitute an annular passage, a second stop element on the opposite side of the piston, there being ports at the ends of said tube communicating the space between the piston and second stop element with the outward end of the stem, and a closure at the other end of the cylinder and through which said stem and tube project, said latter closure having a port in communication with the space in the cylinder between the second stop element and said latter closure.

RICHARD M. DENSMORE.
NEVILLE J. DALTON.

REFERENCES CITED

The following references are of record in the file of this patent:

UNITED STATES PATENTS

| Number | Name | Date |
|---|---|---|
| 2,005,387 | Pelton | June 18, 1935 |
| 2,430,597 | Acton | Nov. 11, 1947 |